Sept. 22, 1959 — A. KUHLENKAMP — 2,904,887
GUN SIGHT
Filed Feb. 18, 1954 — 3 Sheets-Sheet 1

Inventor:
Alfred Kuhlenkamp,
BY L. S. Saulsbury
HIS ATTORNEY.

Sept. 22, 1959  A. KUHLENKAMP  2,904,887
GUN SIGHT

Filed Feb. 18, 1954  3 Sheets-Sheet 2

Inventor:
Alfred Kuhlenkamp,
BY L. S. Saulsbury
HIS ATTORNEY.

Inventor:
Alfred Kuhlenkamp,
BY L. S. Saulsbury
HIS ATTORNEY.

United States Patent Office 2,904,887
Patented Sept. 22, 1959

2,904,887

GUN SIGHT

Alfred Kuhlenkamp, Braunschweig, Germany, assignor to Mathema Corporation Reg. Trust, Vaduz, Liechtenstein, Tangier Application February 18, 1954, Serial No. 411,221

5 Claims. (Cl. 33—49)

This invention relates to aiming devices on or for weapons for combatting mobile targets, especially aircraft in flight.

Aiming devices have heretofore been proposed which are provided with apparatus for the purpose of determining the aiming-off angle when attacking mobile targets, especially aircraft in flight, and in which the apparent direction of flight and the point of contact or point of strike thereon with which the operator much lay an aim on the target, are represented as radially disposed guide lines in a special manner as the product of the estimated or measured target speed and the time of flight of the projectile. The geometrical basis of these aiming devices rests upon the laws governing the plane of flight. Thus (see Fig. 1), by the plane of flight F is understood that plane which passes through the rectilinear path $M-M_1$ of the target and which intersects the horizontal plane in a straight line passing through the position G of the gun or observer. In the plane of flight lies the true path of the plane characterised by the two measuring points M and $M_1$ and the projections M' and $M'_1$ in the horizontal plane. The plane of flight intersects the sphere which must be imagined as surrounding the location of the gun or observer, in a great circle $KM_0M_{10}$ representing the apparent path of flight of the aircraft. On the great circle are located the measuring points $M_0M_{10}$ whose projections have been indicated on the equator $KM_0'M_{10}'$ as $M_0'$ and $M_{10}'$. The apparent path of the aircraft appears in the field of view of the observer under the angle $\alpha$ (Fig. 2) which alters constantly dependent upon the lateral or bearing angle $\sigma$ and the altitude angle or angle of sight $\gamma$ or upon the lateral angle $\sigma'$ in the plane of flight and the angle of inclination T of the plane of flight to the horizontal plane.

In aiming devices of this type heretofore proposed the apparent direction of flight is firstly determined by deviation of the target from the central point, the aiming device remaining fixed; this apparent direction is then converted to the true direction of flight as represented on the horizontal plane, by means of a mechanical drive system. Then the point of contact on this true direction of flight is determined by subtracting the extent of deviation which is calculated from the estimated or measured speed of the target and from the time of flight of the projectile; this point of contact is transferred to the apparent direction of flight as represented in the field of view of the aiming device and is rendered visible to the observer. The disadvantages of this device consist chiefly in that the correction process is unstable due to the necessity of allowing the target to wander, and also to the extensive mechanical drive provisions, and to the necessity of employing additional personnel at the aiming device.

An object of the present invention is to obviate or mitigate the above disadvantages and to provide on or for a weapon for combatting mobile targets, e.g. aircraft in flight, an aiming apparatus which operates continuously and automatically.

In this case, by the aiming-off angle is understood the lateral angle $\Delta\sigma'$ in the plane of flight which lies between the direction to the target (optical direction) and the strike point (direction of the gun-barrel axis). If M is taken as measuring point and $M_1$ as strike point (see especially Fig. 1) the arc $M_0M_{10}$ is equal to the aiming-off angle in the plane of flight which obviously can be resolved into aiming-off components in the vertical aiming plane and in the horizontal plane.

Further advantageous features of the invention will become apparent from a consideration of the following description in conjunction with the accompanying drawings in which.

Figure 2:
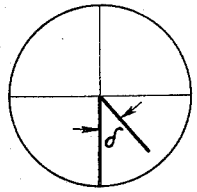
Fig. 2 is a diagram illustrating the apparent path of an aircraft in the field of view of an observer.

Fig. 2 shows the field of view of a telescope provided with cross hairs, the intersection of which is fixed on the target. The vertical cross hair represents the meridian passing through the target. The inclined radial line defining the angle $\delta$ indicates the true direction of flight of the target in the field of view. The radial line represents the "apparent" direction of flight. The "apparent" direction of flight changes with the position of the target relative to the change point in such a way that the angle $\delta$ before the change point is smaller than 90°, at the change point it is exactly 90°, and after the change point it is greater than 90°

Figures 3, 4:
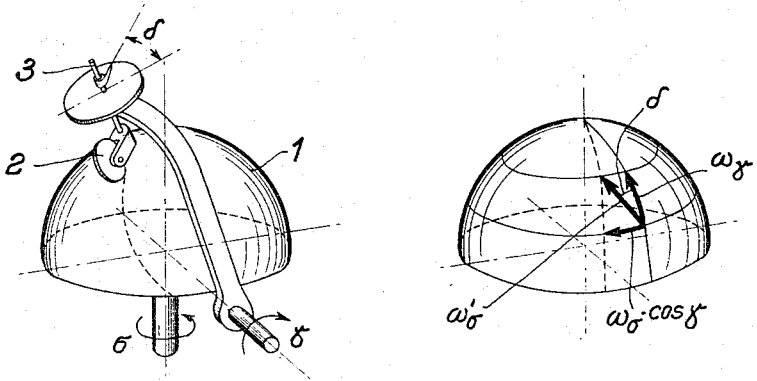
Fig. 3 is a perspective view illustrating a means whereby relative movements of a target are recorded on a sphere.
Fig. 4 is a view similar to Fig. 3 but illustrating an alternative thereto.

In Fig. 3 the aiming device is provided with a system by means of which the relative movements of the target are recorded on a sphere of radius "one," the centre point of which corresponds to the point of vantage of the observer. Thus, a sphere or calotte 1 can be rotated through the calculated bearing angle $\sigma$ in the horizontal plane, whilst a roller 2, a so-called drag-roller held by spring pressure in contact with said sphere, can be actuated through the angle of sight $\gamma$ in the direction of the meridians of the hemisphere. The roller 2 is then rotated around the shaft 3 perpendicular to the meridian and adjusts itself to the apparent direction of flight.

Figure 5:
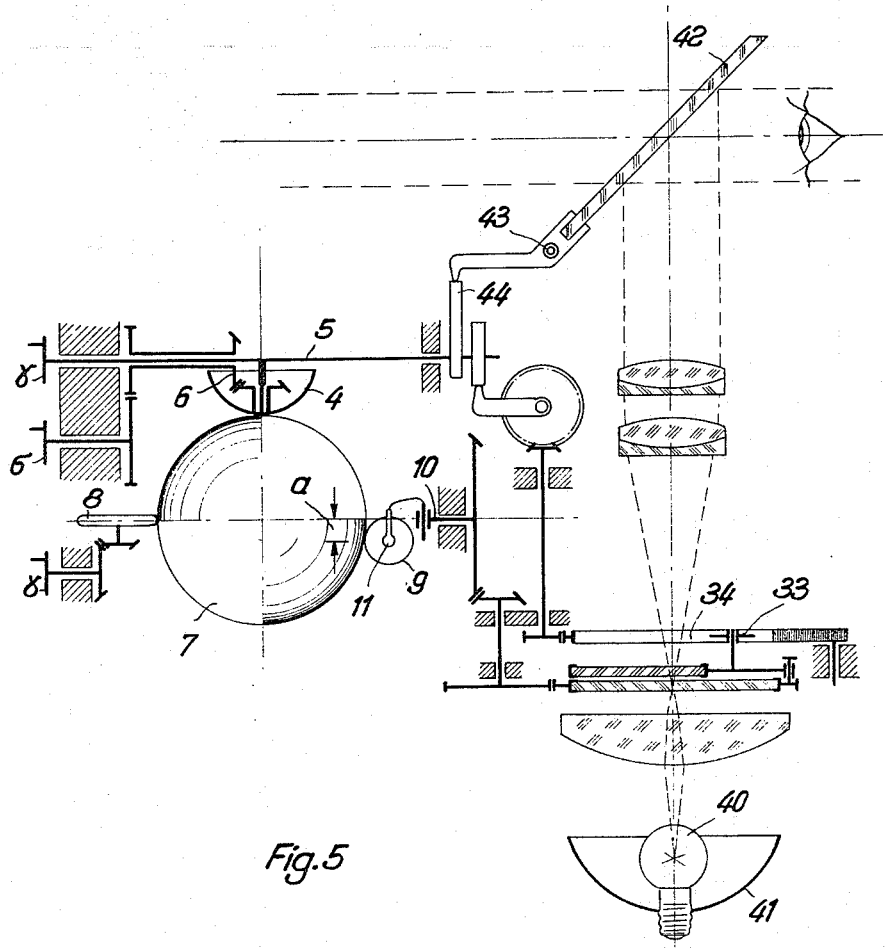
Fig. 5 illustrates diagrammatically a complete aiming device in accordance with the invention.
Figure 6:
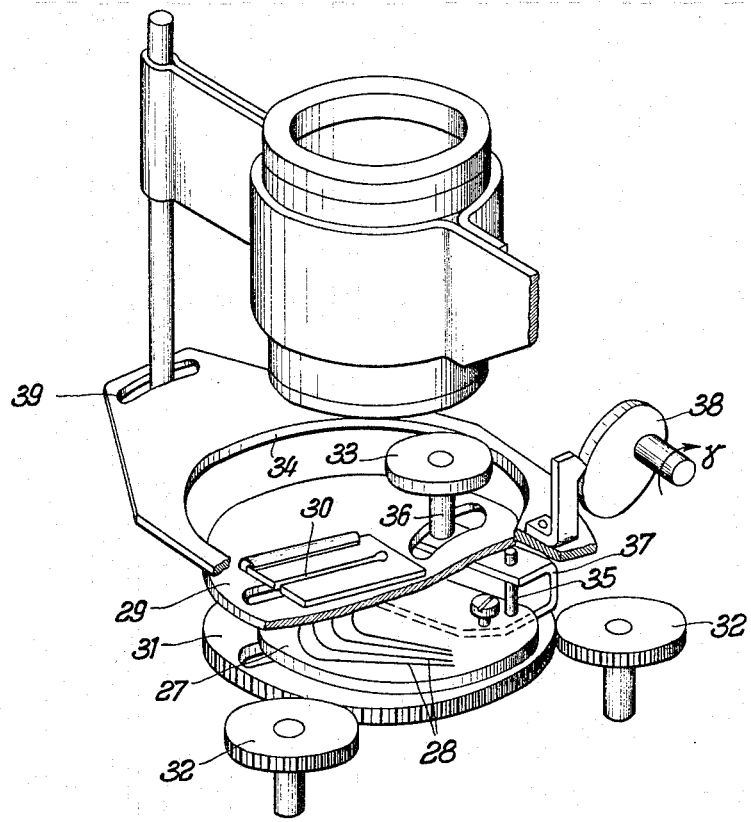
Fig. 6 is a perspective view illustrating a means for fixing the point of contact of the projectile with the target when aiming-off values are smaller than the field of view of the telescope.

Another possibility is shown in Fig. 4. Here velocity data are recorded at any given point of contact between the drag-roller 2 and the calotte 1. At the point of contact there are always two velocity components intersecting, i.e. the angular velocity in the parallel plane and the angular velocity in the meridian plane. The former is calculated from the bearing velocity $\omega\sigma$ in the horizontal plane and the angle of sight $\gamma$ to $\omega'\sigma \cos \gamma$, the latter being given directly from the continuous measurement of the angle of sight and its variation $\omega\gamma$. The momentary direction of motion and the velocity are given as resultants from the two components. The calculation of these resultants may be carried out either by a mechanical geared solution to the mathematical equation or by geometrical representation of the vector triangle. In this case, a calotte 4, Fig. 5, is for example rotated through the angle of sight $\gamma$ by means of the shaft 5 and at the same time is rotated through the lateral angle $\sigma$ in the horizontal plane via the bevel gears 6. The hand wheels $\gamma$ and $\sigma$ turn continuously as the angles change for these hand wheels simultaneously direct the gun mounting or barrel according to the bearing angle or the angle of altitude. The angular velocity of the bearing and altitude angles are continuously set by the sphere 7. The calotte 4 serves to convert the bearing angular velocity measured in the horizontal plane to the bearing angular velocity in the parallel plane which is estimated by the angle of altitude $\gamma$. The represented position of the calotte 4 indicates its position when the angle of altitude $\gamma$ is 90°. In this case the bearing angular velocity is nil. Thus, at the point of contact between the calotte 4 and the sphere 7 a drive speed of $\omega\sigma \cos \gamma$ is obtained. A second roller 8 under spring tension is disposed at 90° to the drive plane and drives the sphere 7 through the angle of sight $\gamma$. The resulting velocity is recorded through the drag-roller 9, whereby turning of the roller 9 around the shaft 10 gives the direction and angle $\delta$, and the rotation of the roller 9 on the roller axis 11 gives the angular velocity $\omega'\sigma$.

The apparent direction of flight and the angular velocity in the plane of flight are, however, the factors governing the determination of the point at which the target should be located on completion of the time of flight of the projectile.

A simple constructional solution is obtained when the point of contact or burst can be indicated within the field of view; i.e. in the case of aiming-off values which are smaller than the field of view.

In this case the mechanical calculation of aiming-off values may be dispensed with and the points of contact can be indicated corresponding to the target velocity for rectilinear horizontal flight, so that the operator is in a position to select the point of contact corresponding to the appropriate target velocity. For this purpose, as for example in Fig. 8, an opaque disc 27 with transparent curves 28 for aiming-off values of target velocity of e.g. 50 m./s., 100 m./s., 200 m./s. and 300 m./s. is fitted in the path of the source of light of a reflex sight. Over the disc 27 is placed a disc 29 with radial slot 30 which indicates in the form of a visible radial line, the direction of flight in the field of view of the sight. The gear 31 is rotated via gears 32 according to the direction of flight by the drag-roller 9 of the sphere drive system, Fig. 5, whereby the disc 29 accompanies the motion by means of the rigid shaft 35 in the disc 31.

The position of the disc 27 with aiming-off curves 28 is calculated according to the spherical angle relationships, from the angle of sight $\gamma$ and the apparent direction of flight angle $\delta$ as in the equation:

$$\cot \sigma'\tau = \cot \gamma \cos \delta$$

Figure 1:
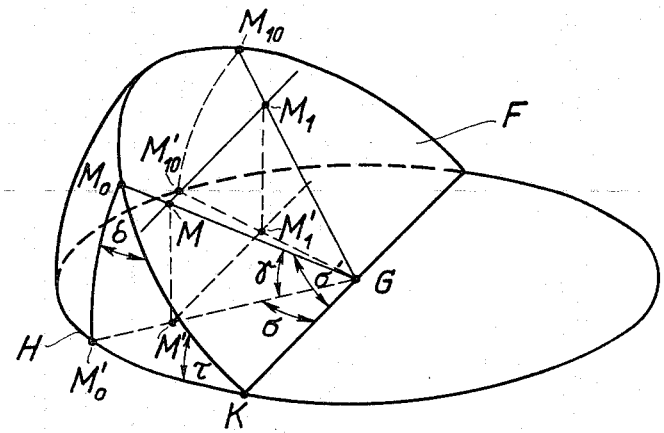
Fig. 1 is a diagram illustrating the various factors which enter into the problem of fixing an aircraft in flight.

The bearing angle $\sigma'\tau$ is the bearing angle in the plane of flight when the gun barrel is directed on the point of impact, previously calculated, at which the projectile and the target should collide. Between the radius through the point of impact and the radius through measuring point M (Figure 1) is the aiming-off angle which is calculated with the sight. The disc 27 is mounted on the frame 37. The circular guide ring 34 is not a true circle but is a function. The shaft 36 is mounted on the frame 37.

Consequently, it is necessary to provide the product $\cot \gamma \cos \delta$ by geared mechanical means and to indicate the aiming-off curves 28 in relation to $\cot \sigma'\tau$. The product $\cot \gamma \cos \delta$ is obtained by displacing the circular guide rim 34 via the eccentric disc 38 in the direction of the guide slot 39 by the value $\cot \gamma$. The circular guide rim 34 serves as guide for the roller 33 rotating on the shaft 36. Moreover, since the frame 37 with shaft 35 is rotated proportional to the angle $\delta$ together with the gear 31, the frame 37 together with the curve-plate 27 is rotated on the shaft 35 approximately corresponding to the function value $\cot \gamma \times \cos \delta$, as follows from the above equation.

The direction of flight then appears to the operator in the field of view of the sight as an illuminated line in which the four points of intersection with the aiming-off curves are seen. The operator selects one of these points corresponding to the estimated target velocity and holds this constantly on the aircraft. The optical axis of the sight which is parallel to the gun barrel is then directed towards the striking point or point of contact.

The entire arrangement is seen in Fig. 5. The sphere drive system already described above is shown on the left; adjoining this is the aiming-off drive system comprising the parts described with reference to Fig. 8. Beneath this is located a source of light 40 with a mirror 41. In the aiming-off drive system the ring plate 34 is displaced by an eccentric disc 38 according to the cotangent of the angle of sight, a cotangent cam being provided at the extreme right hand end (in the drawings) of the shaft 5. The reflex disc or screen 42 is rotated on the axis 43 by means of an eccentric disc 44 rotating in accordance with the angle of altitude or of sight in order to adjust with the angle of incidence. To the observer looking from the right, the illuminated flight direction line with the points of contact appears on the reflex disc 42 and also the aircraft which he must hold continuously on the appropriate burst or contact point. The behaviour of the device is influenced by the dynamic characteristics, the effect of which is, either instability due to over sensitive adjustment whereby a uniform standard of sighting is difficult to obtain, or excessive sluggishness causing unduly large drag errors. Measures are therefore necessary whereby the correct sensitivity of the assembled apparatus can be obtained experimentally.

Furthermore, in order to accelerate the initial adjustment of the drag-roller 9 to the apparent direction of flight to be ascertained, an outwardly directed "flight-direction-control" handle for example can be connected to the axis 10 of the drag-roller 9, Fig. 5; at this point the operator can set an estimated direction of flight. In this case, the measuring device requires to adjust the drag-roller 9 to the precise value only through the necessary correctional rotation.

Finally, the possibility also exists of rendering the continuous adjustment of the apparent direction of flight smoother and more uniform by employing the following geometrical principles. As may be seen from Fig. 1, the temporal variation of the angle of apparent direction of flight $\delta$ on a given plane of flight (angle of inclination $\tau$) is related to the variation in angle of sight $\gamma$ by a mathematical function. Therefore, after the angle has firstly been determined with the assistance of the means described above, one can determine the angle of inclination $\tau$ of the plane of flight by the equation:

$$\cos \tau = \sin \delta \cos \gamma$$

whereupon the apparent angle of direction of flight can be obtained with angle $\tau$ constant through the angle of sight $\gamma$ recorded continuously as the target is tracked. The fluctuations in the angle $\delta$ are then governed only by the fluctuation obtaining for the angle of sight It is to be understood that the aiming device is mounted on the weapon.

I claim:

1. An aiming device on a weapon for combatting mobile targets, especially aircraft, which device is provided with means for determining the aiming-off angle and comprises a rotatable sphere, a drag roller which executes movement over the surface of said sphere, control means positioning said sphere for causing said drag roller to have components of movement disposed in two planes at right angles to one another, which components of movement are in dependence upon the angle of sight and upon the bearing angle respectively for automatically determining the corresponding movement values of target, means for supporting said roller so that it is adjusted into the apparent direction of flight by a turning movement in the plane containing its rotational axis and about an axis perpendicular to the surface of the sphere, sighting means comprising means providing a radially directed line for representing the apparent direction of flight in the sighting means, means providing indications corresponding to various target velocities in the sighting means, and a function drive mechanism connected to said roller automatically adjusting said indications for the instantaneous aiming-off value requisite on the apparent direction of flight, the points thus correlated through the radially directed line and said indications forming the points of contact for superposition on to the target.

2. An aiming device as claimed in claim 1, said supporting means comprising a shaft mounting the drag-roller for rotation about its axis and for turning movement in the plane containing said axis, a manual control member in firm mechanical contact with said shaft to pre-set the roller to an estimated value of the direction of flight of the target, thereby to restrict the automatic setting operation of the roller to the difference between the estimated and measured values of the direction of flight.

3. An aiming device as claimed in claim 1, in which the apparent direction of flight is represented in sighting means comprising a reflex sight having a source of light, and said line providing means includes a first disc having a radial slot located in the path of the light beam from said source of light and normal to the axis of said beam, and said indications providing means includes indications carrying means comprising an opaque disc marked with transparent curves of aiming-off values for various target velocities mounted parallel to the first disc and located on the side thereof remote from the source of light, whereby the direction of flight with contact points indicated thereon is clearly shown in the field of view of the sighting means in the form of a visible radial line, and gears deriving motion from the drag roller rotating the first disc in proportion to the angle of apparent direction of flight.

4. An aiming device as claimed in claim 3, in which there is a frame, a shaft, a feeler-roller, a circular guide plate and an eccentric the opaque disc being rigidly mounted on said frame which is rotatable on said shaft through the medium of said feeler roller guided along said circular guide plate to vary the points of intersection of the curves with the visible radial line to indicate the aiming-off values, the plate being displaced in the direction of a guide slot therein and by means of said eccentric according to the value of the cotangent of the angle of sight.

5. An aiming device in accordance with claim 3, in which there is a shaft and an eccentric, and a screen receiving the light passing through the discs which is rotatable on said shaft by means of said eccentric rotated according to the angle of sight in order to conform to the angle of incidence.

References Cited in the file of this patent

UNITED STATES PATENTS

| | | |
|---|---|---|
| 2,139,636 | House | Dec. 6, 1938 |
| 2,476,625 | Ricordel | July 19, 1949 |
| 2,520,943 | Ludeman | Sept. 5, 1950 |